United States Patent [19]
Armbruster et al.

[11] 3,958,680
[45] May 25, 1976

[54] MOTOR CHAIN SAW WITH PLURAL CLUTCHES AND A BRAKE

[75] Inventors: Herbert Armbruster, Hegnach; Wolfgang Schilling, Kirchberg; Dieter Wieland, Neckarrems, all of Germany

[73] Assignee: Andreas Stihl Maschinenfabrik, Neustadt, Germany

[22] Filed: Dec. 23, 1974

[21] Appl. No.: 535,976

[30] Foreign Application Priority Data
Dec. 22, 1973 Germany............................ 2364288

[52] U.S. Cl. .................... 192/48.5; 192/105 BA; 192/103 B; 192/12 R; 30/383; 74/230.17 B
[51] Int. Cl.² ................. F16D 47/02; F16D 43/24; B60K 41/24; B23D 59/00
[58] Field of Search................... 192/48.5, 35, 48.7, 192/105 BA, 105 BB, 103 R, 103 B, 12 R, 15; 30/383; 74/230.17 B, 230.17 C, 230.17 M

[56] References Cited
UNITED STATES PATENTS

| | | |
|---|---|---|
| 2,709,372 | 5/1955 | Melone.......................... 192/48.5 X |
| 3,131,797 | 5/1964 | Bochan.......................... 192/103 B |
| 3,785,465 | 1/1974 | Johansson ................ 192/105 BA X |
| 3,793,727 | 2/1974 | Moore .................................. 30/383 |
| 3,807,583 | 4/1974 | Johansson...................... 193/48.5 X |
| 3,839,795 | 10/1974 | Dooley................................. 30/383 |

*Primary Examiner*—Samuel Scott
*Assistant Examiner*—Lance W. Chandler
*Attorney, Agent, or Firm*—Walter Becker

[57] ABSTRACT

A motor chain saw with a driving sprocket wheel adapted to be driven by a motor through the intervention of a centrifugal clutch, or the like. A safety clutch is arranged in the driving connection between the motor shaft and the driving sprocket and disengageable by a release mechanism. The safety clutch includes at least one disengageable follower member for interconnecting the two pertaining clutch members while being coaxially arranged with the centrifugal clutch and being located adjacent thereto. The safety clutch is arranged on that side of said centrifugal clutch which faces toward the driving sprocket while being located in the driving connection between the centrifugal clutch and the driving sprocket.

16 Claims, 2 Drawing Figures

MOTOR CHAIN SAW WITH PLURAL CLUTCHES AND A BRAKE

The present invention relates to motor chain saws with a driving sprocket wheel driven by a motor through a centrifugal clutch, or the like, and with a second intermediate clutch which is provided as safety clutch and is adapted to be disengaged by a release, said intermediate clutch being located in the driving connection between the motor and sprocket wheel, said intermediate clutch comprising at least one disengageable follower element for connecting the two pertaining clutch elements and is arranged coaxially with regard to the centrifugal clutch while being axially adjacent to the latter.

With the heretofore known chain saw of the above mentioned general type, the safety clutch is substantially axially adjacent to the centrifugal clutch and is arranged between the centrifugal clutch and the crankshaft housing of the motor. This design results in a rather space requiring arrangement of the safety clutch which is difficult to mount. Another drawback consists in that the post-arrangement of such safety clutch on already existing motor chain saws encounters considerable difficulties.

It is, therefore, an object of the present invention to provide a motor chain saw of the above mentioned general type so that a safety clutch will be obtained which is easy to mount and does not require more space.

These and other objects and advantages of the invention will appear more clearly from the following specification, in connection with the accompanying drawings, in which.

The motor chain saw according to the invention is characterized primarily in that the safety clutch is provided on that side of the centrifugal clutch which faces toward the sprocket wheel and is arranged in the driving connection between the centrifugal clutch and the sprocket wheel.

This arrangement has the advantage over an arrangement of the safety clutch on that side of the centrifugal clutch which faces away from the sprocket wheel, that after removal of the sprocket wheel, the safety clutch is easily accessible. Furthermore, the masses provided on the output side of the safety clutch are relatively small.

Over an arrangement of the safety clutch at the outer circumference of the centrifugal clutch, a considerably more compact and protected design has been obtained according to the invention. The location of the safety clutch according to the invention particularly concerns the follower member or members thereof, while other sections of the safety clutch which are formed by the clutch parts may extend beyond the position axially adjacent to the centrifugal clutch.

Figure 1:
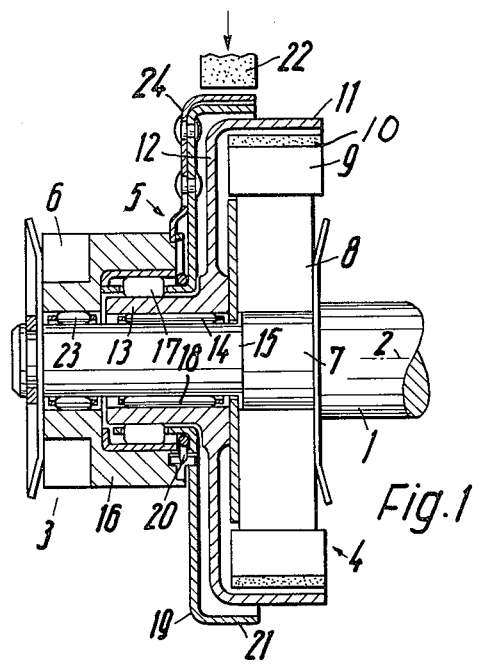
FIG. 1 shows an axial section through a clutch arrangement of a motor chain saw according to the invention.

Referring now to the drawings in detail, FIG. 1 shows a motor chain saw having a crankshaft 1 with an axle 2 arranged at a right angle to a guiding rail not illustrated in detail, for the saw chain. That free end of the crankshaft 1 which projects from the motor housing has rotatably journaled thereon a sprocket wheel 3 which is adapted to be driven by crankshaft 1 through the intervention of an interposed centrifugal clutch 4 and a safety clutch 5. The gear ring 6 of said sprocket wheel 3 for engagement with the saw chain is located in the plane of the guiding rail. With the illustrated embodiment an outwardly located arrangement of the sprocket wheel 3 is provided which means that the sprocket wheel 3 is provided on that side of the centrifugal clutch 4 which faces away from the motor.

The centrifugal clutch 4 has a central body 8 which is nonrotatably connected to a section 7 of the crankshaft 1 and on which there is movably mounted a plurality of centrifugal bodies 9 uniformly distributed over the circumference, said centrifugal bodies 9 being movable against the thrust of non-illustrated springs. On those sides of the centrifugal bodies 9 which face away from the crankshaft axis 2, friction surfaces are provided which are formed by a friction lining 10 and are located opposite to the cylindrical inner surface of a clutch drum 11 extending over said centrifugal bodies 9. The clutch drum 11 which is open toward the motor comprises at its central portion an annular disc-shaped end wall 12 which is provided with a hub 13. Said hub 13 is by means of a needle bearing 14, rotatably journaled on that section 15 of crankshaft 1 which has a reduced diameter and is adjacent to the section 7. Hub 13 projects primarily only from that side of the end face wall 12 which faces away from the central body 8. When the crankshaft 1 has reached a certain minimum speed, the centrifugal bodies 9 are moved radially outwardly and are frictionally connected to the clutch drum 11 so that the latter rotates together with the crankshaft 1. When the centrifugal bodies 9 are in their disengaged position, the crankshaft 1 can rotate relative to the stationary clutch drum 11.

The safety clutch 5 likewise comprises two clutch parts, one of which is formed by the hub 13 of the clutch drum 11, whereas the other clutch part is formed by the hub 16 of the sprocket wheel 3. The hub 16 which has the same outer diameter as the sprocket wheel 3, is located directly axially adjacent to the gear ring 6 and extends over the hub 13 at the outer circumference nearly over the entire length. Between the clutch sections 13, 16 follower members 17 are provided in the form of a ring of clamping rollers, which ring is coaxial with the axis 2 of the crankshaft. These clamping rollers may on one hand engage the outer circumferencial surface of the inner clutch part 13, and on the other hand the inner circumferential surface of the outer clutch part 16 in such a way that the clamping rollers clamp the two clutch parts against each other. For clamping the followers 17, the clutch part is in circumferential direction provided with ascending clamping surfaces in such a way that the clutch part 16 on the driving side is taken along by the clutch part 13 on the driving side only in one direction of rotation, namely, the direction in which the working is effected.

The follower elements 17 are arranged in openings of an approximately cylindrical cage 18 extending between the clutch parts 13, 16. The cage 18 forms the hub of a drum-shaped release element 19. The release element 19 which is expediently for a return position spring loaded by a spring 20 comprises at the outer circumference a release and brake surface 21 for the engagement by a brake element 22, which is movable on the housing of the motor chain saw in radial direction with regard to the crankshaft axis 2, said release and brake surface 21 extending over the clutch drum 11. This brake element 22 is actuated by a release member, not illustrated in detail, for instance, an impact arm located in front of the front holding handle of the motor chain saw. This impact arm is so arranged that when the operator's hand slips over the front holding handle in the direction toward the saw chain, the brake element 22 is moved toward the release and brake surface 21. Due to the actuation or braking of the release member 19, the follower members 17 are adjusted relative to the coupling part 16 at the output side so that they are out of engagement, which means that the two clutch parts 13, 16 no longer clamp against each other so that the clutch part 13 on the driving side can continue its rotation without taking along the driving sprocket wheel. Since the driving sprocket wheel 3 with a needle bearing 23 directly adjacent to the inner clutch part 13 is rotatably journaled on the end section 15 of the crankshaft 1, the driving sprocket wheel 3 is able in spite of the engaged centrifugal clutch 4 to stop while the safety clutch 5 is disengaged. For purposes of stopping the driving sprocket wheel 3 relative to the release member 19 in the direction of rotation, a locking pawl 24, or the like, may on the release member 19 be mounted so as to be radially movable against the thrust of a spring, while this arresting or locking pawl 24 provided for engagement with the clutch part 16 is likewise actuated by the brake member 22.

Figure 2:
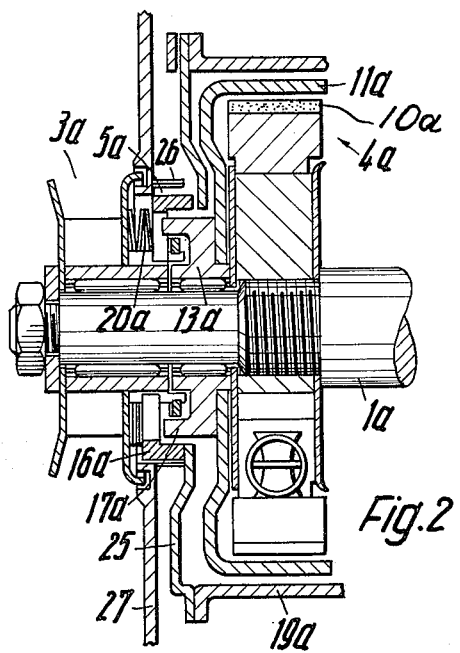
FIG. 2 illustrates a modification of the arrangement of FIG. 1.

The arrangement shown in FIG. 2 is somewhat modified over that of FIG. 1, while all those parts corresponding to the parts in FIG. 1 have been designated with the same reference numeral as in FIG. 1, but with the additional reference character *a*.

While with the embodiment of FIG. 1, the followers 17 of the safety clutch 5 are arranged on that side of the centrifugal clutch 4 which faces the driving sprocket wheel 3, and more specifically, is provided within the element forming the driving sprocket wheel 3, the follower members 17*a* are, with the embodiment of FIG. 2, also primarily axially adjacent to the structural element forming the driving sprocket wheel 3*a*, in other words, axially between the driving sprocket wheel and the centrifugal clutch 4*a*. The safety clutch 5*a* is designed as an axially adjustable jaw clutch, of which the jaws which project axially toward the sprocket wheel 3*a* and form the follower members 17*a* are provided on the clutch element 13*a*, which forms the hub of the clutch drum 11*a*. The clutch member 16*a* of the safety clutch 5*a* which is located on the output side thereof and is formed by a ring is axially displaceable on the hub of the driving sprocket wheel 3*a* against the thrust of springs 20*a* and within its outer circumference has engaging openings for the follower members 17*a*, while the follower members 17*a*, when the clutch member 16*a* occupies a position corresponding to the upper section of FIG. 2, engage the engaging openings and in the other position corresponding to the lower section of FIG. 2 are located outside said engaging openings so that the clutch member 13*a* is able to rotate freely relative to the clutch member 16*a* which is nonrotatably connected to the driving sprocket wheel 3*a*.

Between the clutch member 16*a* of the safety clutch 5*a* on the output side and the clutch drum 11*a* there is provided an approximately disc-shaped ring 25 of the release member 19*a*. The said ring 25 extends by means of a sleeve-shaped section around the outer circumference of the clutch drum 11*a* and is axially movably mounted. The ring 25 surrounding the outer circumference of the clutch member 13*a* is adapted to be pressed against the end face which pertains to the clutch member 16*a* on the output side and which faces toward the clutch drum 11*a* so that this clutch member 16*a* moves against the thrust of springs 20*a* to its disengaging position, and the safety clutch 5*a* is disengaged. In this connection, the ring 25 forms with the pertaining end and face of the clutch member 16*a* an axial bearing by means of which the release member 19*a* is connected to the safety clutch 5*a* so that a very wear-resistant shifting of the safety clutch will be possible.

At the circumference of the clutch member 16*a* at the output side, there is arranged a brake element 26 of the band brake, which brake element is formed by a loop band. By means of said band brake, the clutch member 16*a* and thus the driving sprocket wheel 3*a* can immediately after disengagement of the safety clutch 5*a* be braked to a standstill. The brake element 26 is located on a housing cover which covers the freewheel clutch 4*a* and the safety clutch 5*a*. On the inside of said housing cover is provided primarily the safety clutch 5*a*, while at the outside of said housing cover, there is provided the driving sprocket wheel 3*a*.

It is, of course, to be understood that the present invention is, by no means, limited to the specific showing in the drawing, but also comprises any modifications within the scope of the appended claims.

What we claim is:

1. A motor chain saw which includes: motor operable shaft means, a driving sprocket wheel rotatably mounted on said shaft means, a centrifugal clutch comprising a central body having an outer peripheral friction surface responsive to a centrifugal force corresponding to a preselected speed of rotation of said shaft means to move radially outwardly, said central body being fixed to said shaft means in axially spaced relationship to said driving sprocket wheel, said centrifugal clutch also comprising a clutch drum having a hub rotatably mounted on said shaft means and also having an outer peripheral cylindrical surface extending over said outer peripheral friction surface for frictional cooperation therewith at said preselected speed of rotation of said shaft means, and a safety clutch having two clutch elements, one of said two clutch elements being formed by the hub of said clutch drum and the other one of said two clutch elements being formed by the hub of said sprocket wheel, said safety clutch being located on that side of said centrifugal clutch which faces toward said sprocket wheel and being interposed in the driving connection between said centrifugal clutch and said sprocket wheel.

2. A saw according to claim 1, in which said safety clutch is arranged axially adjacent said sprocket wheel within the space between said centrifugal clutch and said sprocket wheel.

3. A saw according to claim 1, in which said safety clutch is arranged at least partially within said sprocket wheel.

4. A saw according to claim 1, in which said safety clutch is arranged at least partially within a structural element forming said sprocket wheel.

5. A saw according to claim 1, in which said safety clutch is located at least partially within the outer diameter of said clutch drum.

6. A saw according to claim 1, in which said safety clutch is arranged at least partially within the sprocket wheel.

7. A saw according to claim 1, in which the hub of said clutch drum directly forms that clutch part of the safety clutch which is adjacent to said sprocket wheel.

8. A saw according to claim 1, in which that clutch part of the safety clutch which is adjacent said sprocket wheel extends in axial direction of said shaft means over that clutch part of said safety clutch which is adjacent said centrifugal clutch.

9. A saw according to claim 8, in which that clutch part of the safety clutch which is adjacent said sprocket wheel extends in axial direction of said shaft means over the outer circumference of the output clutch part of said safety clutch.

10. A saw according to claim 1, in which that clutch part of the safety clutch which forms the clutch part on the output side is directed axially directly adjacent the sprocket wheel.

11. A saw according to claim 10 in which the clutch part pertaining to and located on the output side of said safety clutch forms one piece with said sprocket wheel.

12. A saw according to claim 10, which includes a release associated with the clutch part of the safety clutch on the output side of the latter, and also includes a release member operable by said release for said safety clutch, the release movement of said release member being directed in circumferential direction relative to said last mentioned clutch part.

13. A saw according to claim 10, which includes a release associated with the clutch part of the safety clutch on the output side of the latter, and also includes a release member operable by said release for said safety clutch, the release movement of said release member being directed in axial direction with regard to said last mentioned clutch part.

14. A saw according to claim 1, which includes ring means interposed between the output clutch part of said safety clutch and said clutch drum and associated with said release member, said release member being axially movable and extending over the outer circumference of said clutch drum.

15. A saw according to claim 14, in which said ring means forms together with the pertaining end face of the safety clutch part on the output side of said safety clutch an axial bearing connecting said release member to said safety clutch.

16. A saw according to claim 15, which includes a friction brake for braking said sprocket wheel, said friction brake being operable selectively by said release.

* * * * *